(12) United States Patent
Shiroishi (10) Patent No.: US 11,584,425 B2
(45) Date of Patent: Feb. 21, 2023

(54) STEERING DEVICE

(71) Applicant: YAMADA MANUFACTURING CO., LTD., Kiryu (JP)

(72) Inventor: Yoshinori Shiroishi, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/830,819

(22) Filed: Jun. 2, 2022

(65) Prior Publication Data
US 2022/0396301 A1 Dec. 15, 2022

(30) Foreign Application Priority Data

Jun. 10, 2021 (JP) .............................. JP2021-097390

(51) Int. Cl.
*B62D 1/19* (2006.01)
*B62D 1/187* (2006.01)

(52) U.S. Cl.
CPC ................ *B62D 1/19* (2013.01); *B62D 1/187* (2013.01)

(58) Field of Classification Search
CPC .......... B62D 1/195; B62D 1/192; B62D 1/18; B62D 1/19
USPC ......................................... 188/371; 280/777
See application file for complete search history.

(56) References Cited

U.S. PATENT DOCUMENTS

| | | | | |
|---|---|---|---|---|
| 3,612,223 A * | 10/1971 | Shiomi | .................... | F16F 7/128 293/133 |
| 3,769,851 A * | 11/1973 | Edme | .................... | B62D 1/192 188/371 |
| 4,445,708 A * | 5/1984 | Oakes | .................... | B62D 1/192 188/371 |
| 5,775,172 A * | 7/1998 | Fevre | .................... | B62D 1/195 188/371 |
| 6,170,873 B1 * | 1/2001 | Jurik | .................... | B62D 1/195 188/371 |
| 6,170,874 B1 * | 1/2001 | Fosse | .................... | B62D 1/195 280/777 |
| 9,944,309 B2 * | 4/2018 | Matsuno | .................. | B62D 1/19 |
| 10,259,487 B2 * | 4/2019 | Soderlind | .............. | B62D 1/187 |

(Continued)

FOREIGN PATENT DOCUMENTS

| JP | 2004-338551 | | 12/2004 |
|---|---|---|---|
| KR | 0139854 Y1 | * | 4/1999 |
| KR | 20140104729 A | * | 3/2018 |

*Primary Examiner* — Paul N Dickson
*Assistant Examiner* — Maxwell L Meshaka
(74) *Attorney, Agent, or Firm* — Rankin, Hill & Clark LLP (57) ABSTRACT

A steering device includes an inner column, an outer column, a hanger bracket, and a fixing member. The hanger bracket has a guide hole which extends in the front-rear direction and through which the shaft portion of the fixing member passes. An edge portion of the guide hole of the hanger bracket is provided with a fixing portion and a gradually increasing resistance portion. The seat portion of the fixing member comes into contact with the fixing portion to fix the hanger bracket to the inner column. The gradually increasing resistance portion is disposed in front of the fixing portion and gradually increases frictional resistance between the fixing member and the hanger bracket according to forward displacement of the fixing member when the fixing member is displaced forward together with inner column by a secondary collision load being input to the steering shaft.

5 Claims, 8 Drawing Sheets

(56) References Cited

U.S. PATENT DOCUMENTS

| | | | |
|---|---|---|---|
| 10,717,457 B2* | 7/2020 | Dubay | B62D 1/19 |
| 10,981,590 B2* | 4/2021 | Kim | B62D 1/19 |
| 11,225,281 B2* | 1/2022 | Anspaugh | B62D 1/195 |
| 11,225,282 B2* | 1/2022 | Toyoda | B62D 1/181 |
| 11,479,288 B2* | 10/2022 | Huber | B62D 1/181 |
| 2006/0290128 A1* | 12/2006 | Ridgway | B62D 1/195 |
| | | | 280/779 |
| 2007/0013183 A1* | 1/2007 | Jensen | B62D 1/195 |
| | | | 280/777 |
| 2008/0100050 A1* | 5/2008 | Menjak | B62D 1/195 |
| | | | 280/777 |
| 2008/0238070 A1* | 10/2008 | Bodtker | B62D 1/195 |
| | | | 74/492 |
| 2017/0113711 A1* | 4/2017 | Matsuno | B62D 1/19 |
| 2019/0054949 A1* | 2/2019 | Soderlind | B62D 1/187 |
| 2019/0382043 A1* | 12/2019 | Dubay | B62D 1/184 |
| 2020/0198685 A1* | 6/2020 | Anspaugh | B62D 1/19 |
| 2020/0339178 A1* | 10/2020 | Toyoda | B62D 1/19 |
| 2020/0346680 A1* | 11/2020 | Kim | B62D 1/184 |
| 2021/0046970 A1* | 2/2021 | Huber | B62D 1/181 |
| 2021/0197884 A1* | 7/2021 | Fèvre | B62D 1/185 |
| 2022/0266890 A1* | 8/2022 | Buzzard | B62D 1/195 |
| 2022/0396302 A1* | 12/2022 | Shiroishi | B62D 1/192 |

* cited by examiner

STEERING DEVICE

CROSS-REFERENCE TO RELATED APPLICATION

Priority is claimed on Japanese Patent Application No. 2021-097390, filed Jun. 10, 2021, the content of which is incorporated herein by reference.

BACKGROUND OF THE INVENTION

Field of the Invention

The present invention relates to a steering device.

Description of Related Art

Some steering devices have a telescopic function for adjusting a front-rear position of a steering wheel according to a physique or a driving posture of a driver. This type of steering device includes an inner column that rotatably supports a steering shaft and an outer column that movably supports the inner column in a front-rear direction.

The steering device is installed with a mechanism that alleviates an impact load applied to the driver in a process in which the inner column moves forward with respect to the outer column (a collapse stroke) in a case where a predetermined load acts on the steering wheel from an occupant during a secondary collision.

Here, for example, Patent Document 1 below discloses a configuration in which a steering column is supported by a bracket via tilt plates provided on both left and right sides of the steering column. Specifically, in the configuration of Patent Document 1 below, the steering column is supported by a tilt pin protruding from the bracket being held in a hole portion formed in the tilt plate. An elongated hole for a guide is formed in the tilt plate to be continuous behind the hole portion. A bulging portion whose bulging height gradually increases toward the rear is fixed to a lower surface of the steering column on a front side in a support position by the bracket.

In the steering device described in Patent Document 1, the tilt pin comes out of the hole portion and moves relative to the inside of the elongated hole as the inner column moves forward during the collapse stroke. At this time, a posture of the steering column is stabilized by a guidance function of the elongated hole and the bracket comes into contact with the bulging portion, and thus the bulging portion is gradually crushed and art energy of the impact load is absorbed.

PATENT DOCUMENTS

[Patent Document 1] Japanese Unexamined Patent Application, First Publication No. 2004-338551

SUMMARY OF THE INVENTION

However, in the above-mentioned steering device, there is still room for improvement in efficiently absorbing the energy of the collision load when a secondary collision load is input while reducing the size and cost.

An aspect according to the present invention has been made in view of the above-mentioned problems, and an object of the present invention is to provide a steering device able to efficiently absorb the energy of the collision load when a secondary collision load is input while reducing the size and cost.

The present invention has adopted the following configuration in order to solve the above problems.

(1) A steering device according to an aspect of the present invention includes: an inner column that rotatably supports a steering shaft; an outer column which is supported by a vehicle body in a state where displacement thereof in a front-rear direction is restricted and in which the inner column is inserted such that a position thereof can be adjusted in the front-rear direction; a hanger bracket that is attached to the inner column and has a stopper portion which restricts excessive displacement of the inner column by coming into contact with a displacement restricting portion on a side of the outer column when the inner column is displaced in the front-rear direction; and a fixing member that has a shaft portion which passes through the hanger bracket and of which one end side is coupled to the inner column and a seat portion which is provided on the other end side of the shaft portion to press and fix the hanger bracket against and to the inner column, wherein the hanger bracket has a guide hole which extends in the front-rear direction and through which the shaft portion of the fixing member passes, wherein an edge portion of the guide hole of the hanger bracket is provided with a fixing portion with which the seat portion of the fixing member comes into contact to fix the hanger bracket to the inner column, and a gradually increasing resistance portion which is disposed in front of the fixing portion and gradually increases frictional resistance between the fixing member and the hanger bracket according to forward displacement of the fixing member when the fixing member is displaced forward together with inner column by a secondary collision load being input to the steering shaft.

With the above configuration, when a front-rear position of the inner column is adjusted, the stopper portion of the hanger bracket comes into contact with the displacement restricting portion on a side of the outer column, and thus excessive displacement of the inner column is restricted. At this time, since the hanger bracket is integrally fixed to the inner column by the fixing member, excessive displacement of the inner column in the frost-rear direction is restricted via the hanger bracket.

On the other hand, when the secondary collision load is input to the steering shaft front an occupant with the front-rear position of the inner column fixed at an arbitrary position, the inner column moves forward against the restraining force of the inner column by the outer column. When the inner column is displaced forward by a set amount, the stopper portion of the hanger bracket comes into contact with the displacement restricting portion on a side of the outer column. At this time, when the input of the secondary collision load to the steering shaft continues, a reaction force received by the hanger bracket from the displacement restricting portion on a side of the outer column increases. As a result, the fixing member is displaced forward together with the inner column against the frictional restraining force on the hanger bracket by the seat portion of the fixing member. At this time, while the shaft portion of the fixing member is guided by the guide hole, the gradually increasing resistance portion gradually increases the frictional resistance between the fixing member and the hanger bracket according to the forward displacement of the fixing member. During this period, a posture of the inner column is stably maintained by the guiding action by the shaft portion of the fixing member and the guide hole, and the energy of the secondary collision load is absorbed by the inner column sliding with respect to the outer column and the hanger bracket. As the forward displacement of the inner column progresses, the frictional resistance between the fixing member and the hanger bracket gradually increases, and thus it is possible to efficiently absorb the energy of an impact load while suppressing a sudden increase in the reaction force near a stroke end on a front side of the inner column.

(2) In the above aspect (1), an inclined surface of which a protrusion height in a direction toward the seat portion of the fixing member gradually increases toward a front side and a contact load with the seat portion gradually increases according to the forward displacement of the fixing member at the time of input of the secondary collision load may be provided in front of the fixing portion of the edge portion of the guide hole, and the gradually increasing resistance portion may be constituted by the inclined surface.

In this case, since the inclined surface of which a protrusion height gradually increases toward a front side is provided in front of the fixing portion, when the fixing member is displaced forward together with the inner column at the time of input of the secondary collision load, the contact load between the seat portion of the fixing member and the inclined surface gradually increases according to the forward displacement of the fixing member. As a result, the frictional resistance between the fixing member and the hanger bracket gradually increases, and it is possible to efficiently absorb the energy of the impact load while suppressing a sudden increase in the reaction force near the stroke end.

(3) In the above aspect (1) or (2), a plurality of the fixing members may be disposed at positions of the inner column separated from each other in an axial direction, the hanger bracket may be fixed at a plurality of positions of the inner column separated from each other in the axial direction by each of the fixing members, and the hanger bracket may be provided with the fixing portion to correspond to each of the fixing members.

In this case, when the secondary collision load is input, the guide action by the shaft portion of the fixing member and the guide hole, and the fixing and sliding at she seat portion of the fixing member and the edge portion of the guide hole can be shared by the plurality of fixing members. Therefore, the behavior (the collapse stroke) of the inner column at the time of input of the secondary collision load can be further stabilized.

In the present configuration, since the hanger bracket is fixed to the inner column by the plurality of fixing members at positions separated in the front-rear direction, when the stopper portion of the hanger bracket comes into contact with the displacement restricting portion on a side of the outer column, it is possible to prevent the end portions of the hanger bracket in the front-rear direction from being separated (floating) from the inner column. Therefore, in a case where the present configuration is adopted, the commercial value of the steering device for adjusting the front-rear position of the inner column can be enhanced, and the operation of the hanger bracket or the inner column can be stabilized when the secondary collision load is input.

(4) In the aspect (3), a low level region having a protrusion height in a direction toward the seat portion of the fixing member lower than that of the fixing portion may be disposed at a position adjacent, to a front side of at least one fixing member of the edge portion of the guide hole.

In this case, at the position where the seat, portion of the fixing member faces the low level region, the frictional restraining force between the seat portion and the edge portion of tire guide hole becomes small. Therefore, it is possible to keep the initial operating load relatively small when the secondary collision load is input and to absorb the energy of the secondary collision load smoothly.

(5) In any one of the above aspects (1) to (4), the fixing member may be constituted by a fastening member capable of managing tightening torque.

In this ease, by adopting the fastening member as the fixing member and managing the tightening torque of the fastening member, the frictional restraining force of the seat portion of the fixing member on the hanger bracket can be accurately set and adjusted. Therefore, in a case where the present configuration is adopted, the hanger bracket can be securely fixed to the inner column during normal use, and stable energy absorption performance can be obtained according to settings when the secondary collision load is input.

In the aspects of the present invention, when the secondary collision load is input, output, the posture of the inner column can be stably maintained by the guiding action by the guide hole of the hanger bracket and the shaft portion of the fixing member, and the gradually increasing resistance portion gradually increases the frictional resistance between the fixing member and the hanger bracket according to the forward displacement of the fixing member. As a result, it is possible to efficiently absorb the energy of an impact load while suppressing a sudden increase in the reaction force near a stroke end on a front side of the inner column. Therefore, in a case where the aspects according to the present invention are adopted, it is possible to efficiently absorb the energy of the collision load when the secondary collision load is input while reducing the size and cost.

DETAILED DESCRIPTION OF THE INVENTION

Hereinafter, embodiments of the present invention will be described with reference to the drawings. In each of the embodiments which will be described below, the same reference signs will be given to the common parts, and some duplicate explanations will be omitted.

First Embodiment

Figure 1:
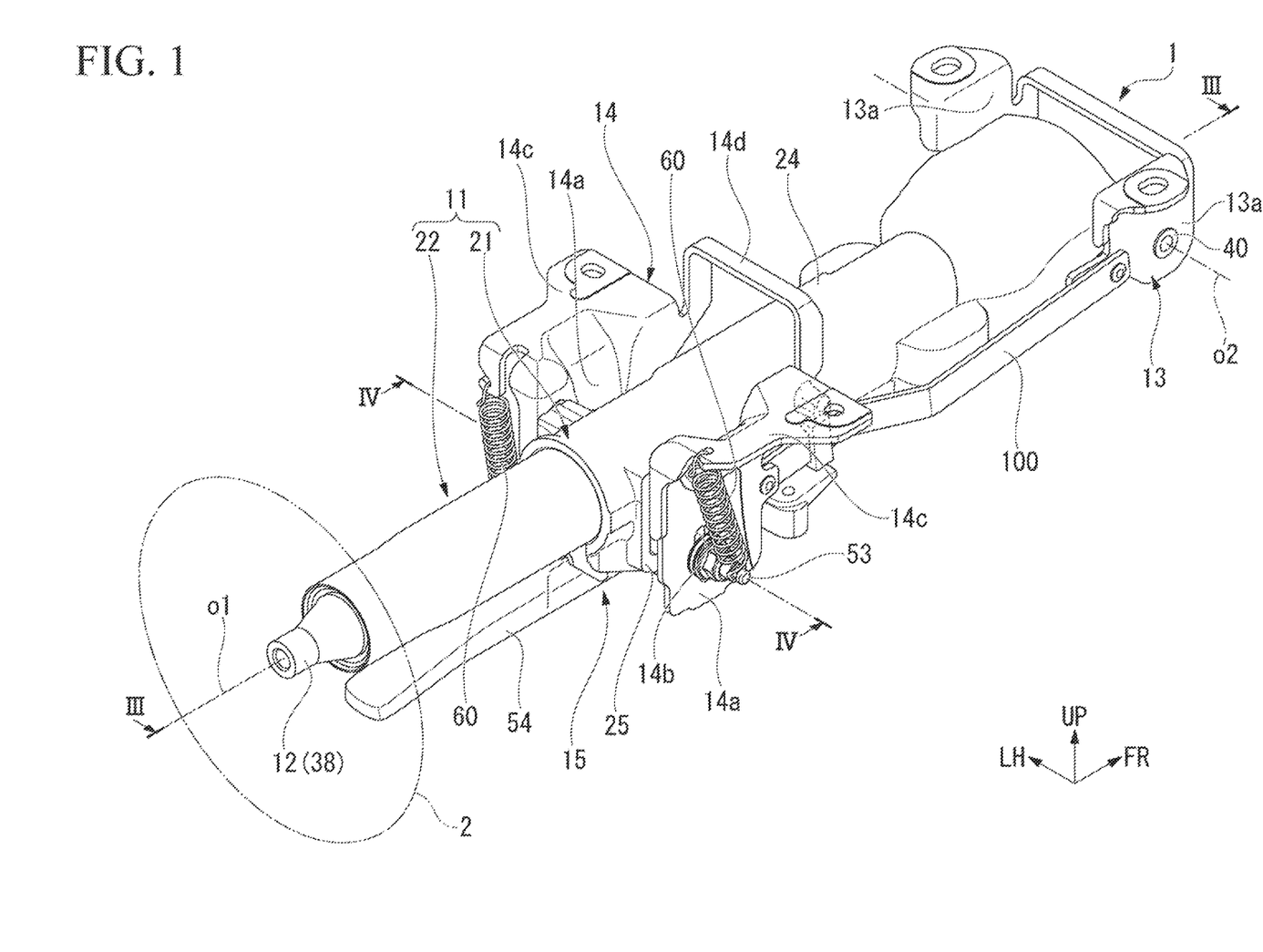
FIG. 1 is a perspective view of a steering device of a first embodiment.
Figure 2:
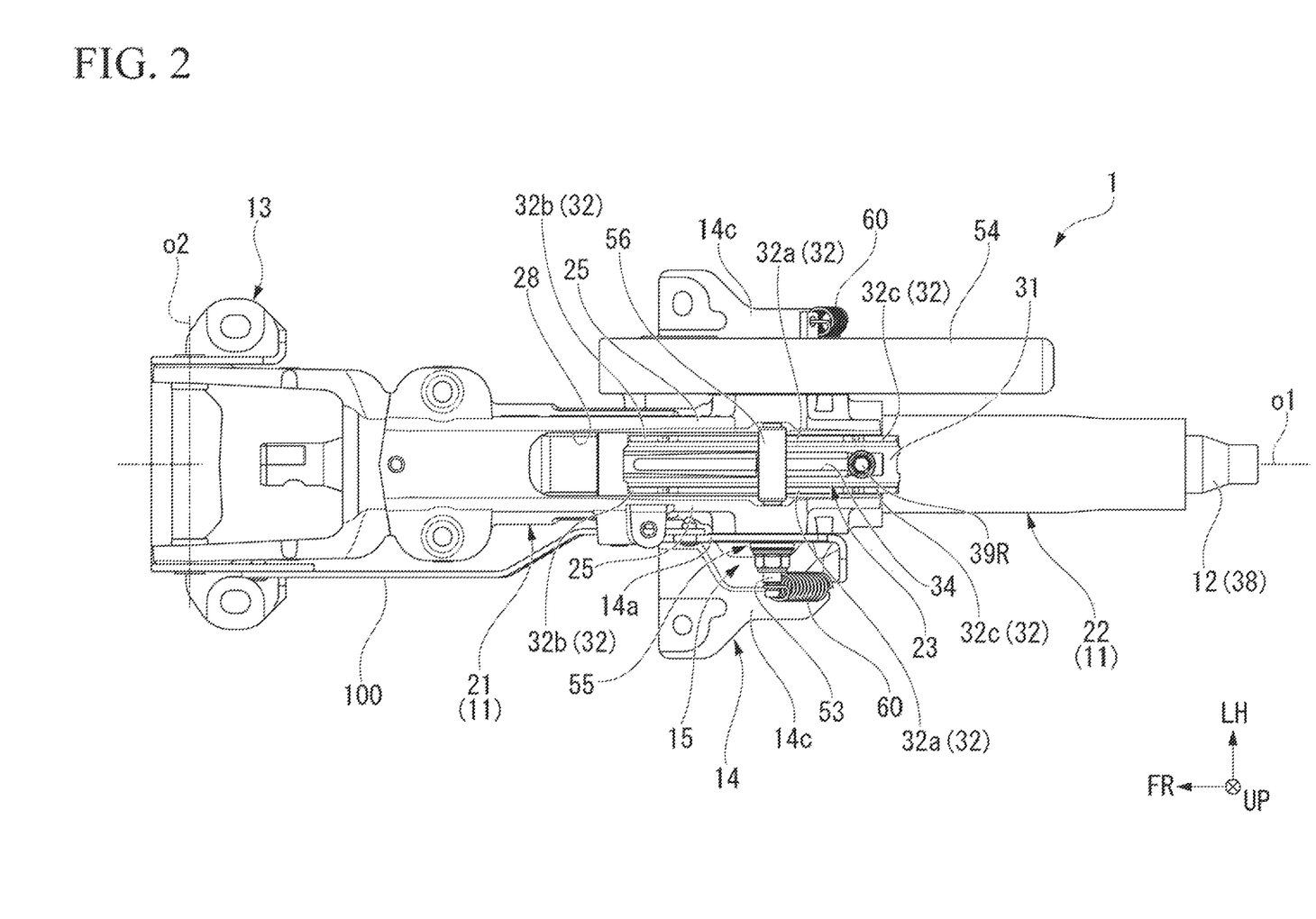
FIG. 2 is a bottom view of the steering device of the first embodiment.
Figure 3:
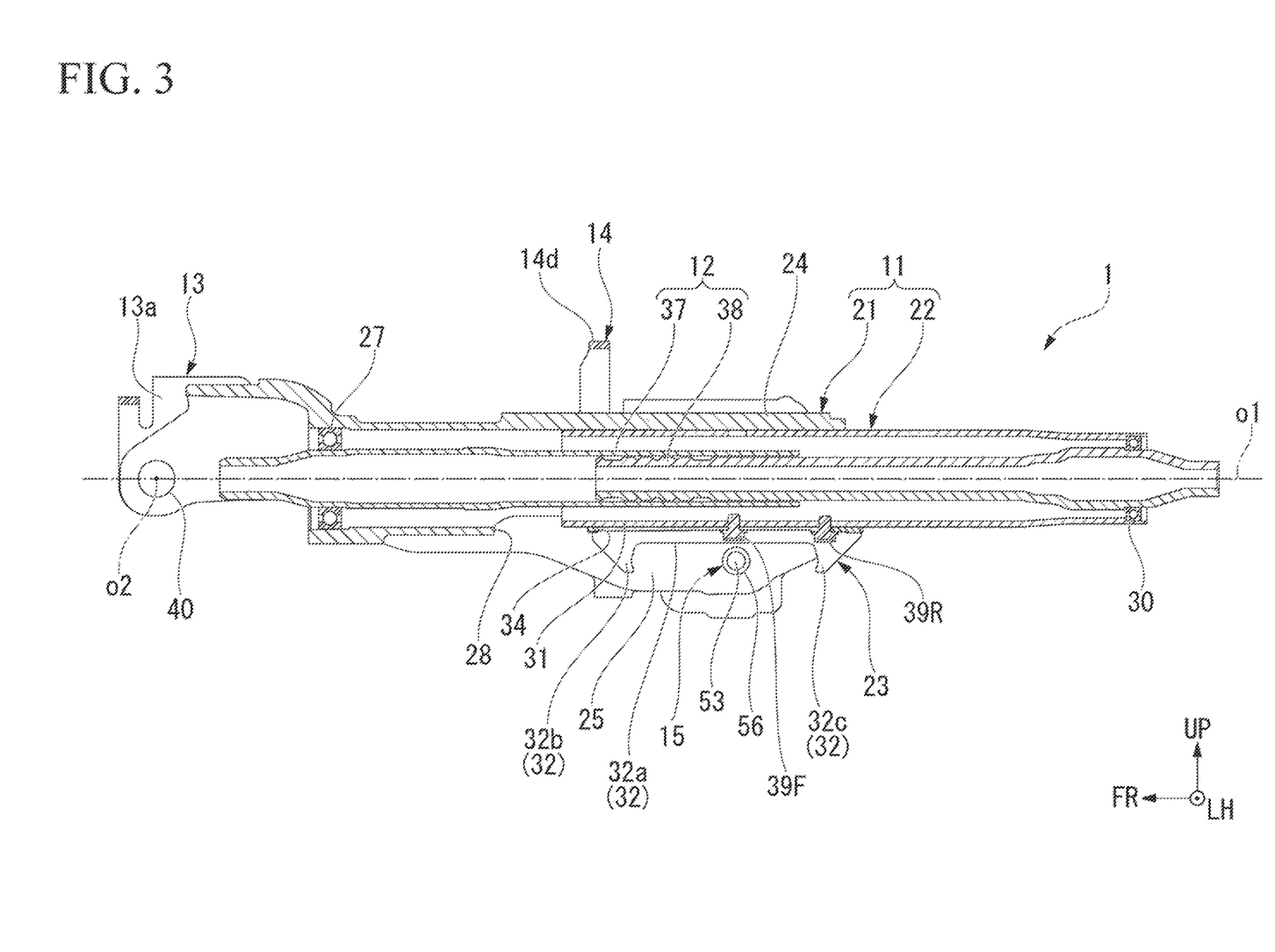
FIG. 3 is a cross-sectional view along a line III-III of FIG. 1.

FIG. 1 is a perspective view of a steering device 1 of the present embodiment, and FIG. 2 is a bottom view of the steering device 1. FIG. 3 is a cross-sectional view along a line III-III of FIG. 1.

The steering device 1 is disposed in front of a driver's seat of a vehicle. The steering device 1 adjusts a steering angle of front wheels of the vehicle by a rotation operation of a steering wheel 2 performed by a driver. The steering device 1 has a telescopic function for adjusting a front-rear position of the steering wheel 2 according to a physique or a driving posture of a driver and a tilt function for adjusting a tilt angle of tire steering wheel 2 in a vertical direction according thereto. Hereinafter, an operation of the steering device 1 by the telescopic function is referred to as a "telescopic operation."

The steering device 1 includes a column unit 11, a steering shaft 12, a front bracket 13, a rear bracket 14, and a lock mechanism 15. The column unit 11 and the steering shaft 12 are each formed along an axis o1. In the following description, in some cases, an extending direction of the axis o1 of the column unit 11 and the steering shaft 12 is simply referred to as a shaft axial direction, a direction orthogonal to the axis o1 is referred to as a shaft radial direction, and a direction around the axis of is referred to as a shaft circumferential direction.

The steering device 1 of the present embodiment is installed on the vehicle in a state where the axis o1 is inclined in the vertical direction with respect to a front-rear direction of the vehicle. Specifically, the axis o1 of the steering device 1 is inclined such that a height increases toward the rear. However, in the following description, for convenience of explanation, in the steering device 1, a direction toward the steering wheel 2 in the shaft axial direction is simply referred to as a rear direction, and a direction toward a side opposite to the steering wheel 2 is simply referred to as a front direction. In the shaft radial direction, a vertical direction in a case where the steering device 1 is attached to the vehicle is simply a vertical direction, and a left-right direction in that ease is simply a left-right direction.

In the figure, an arrow FR pointing "forward," an arrow UP pointing "upward," and an arrow LB pointing "left" are shown.

<Column Unit 11>

The column unit 11 includes an outer column 21, an inner column 22, and a hanger bracket 23.

Figure 4:
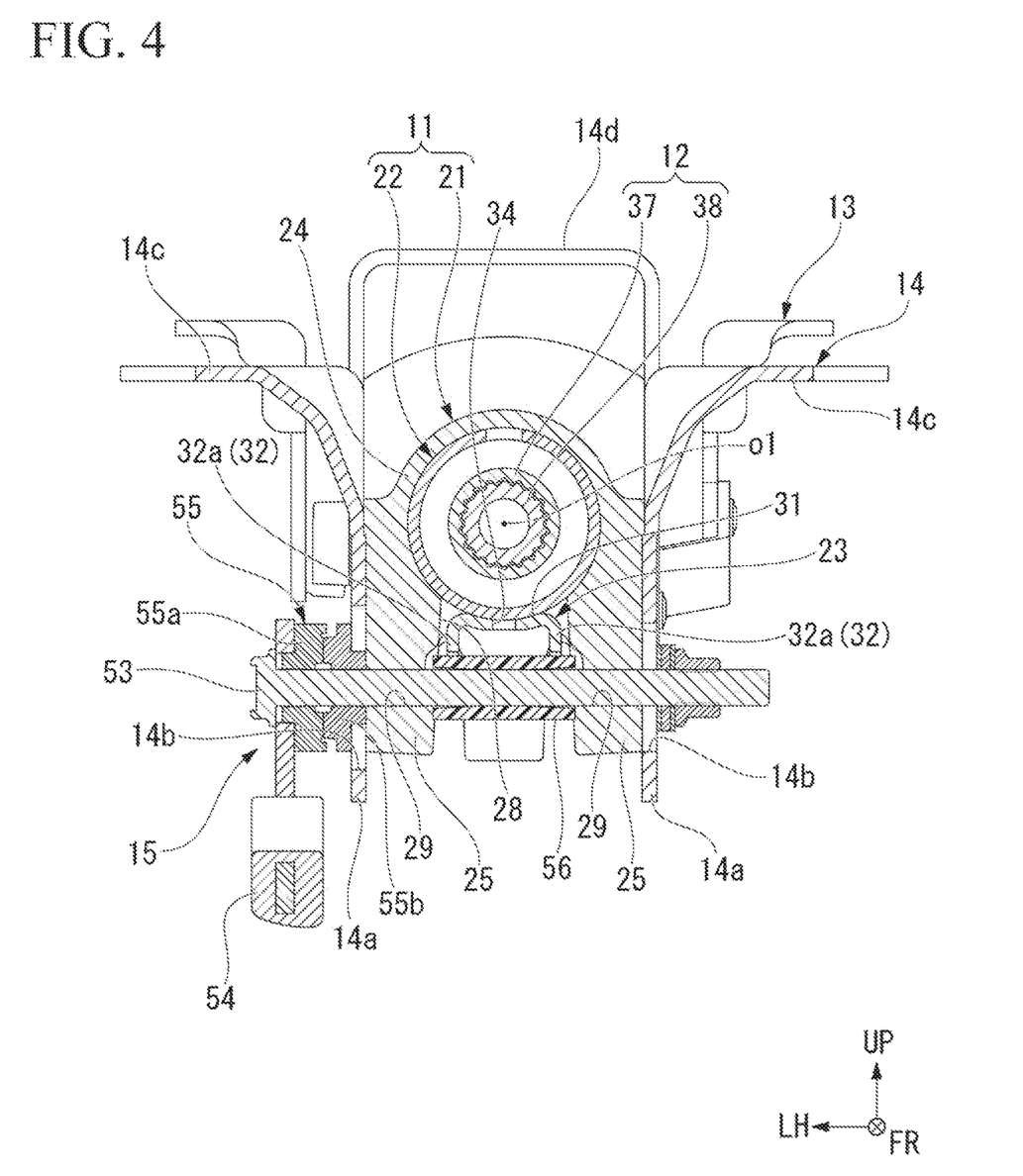
FIG. 4 is a cross-sectional view along a line IV-IV of FIG. 1.

FIG. 4 is a cross-sectional view along a line IV-IV of FIG. 1.

The outer column 21 is fixed to a vehicle body via a front bracket 13 and a rear bracket 14. The outer column 21 includes a holding cylinder portion 24 and a pair of tightening portions 25.

The holding cylinder portion 24 is formed in a cylindrical shape extending in the front-rear direction. As shown in FIG. 3, a front bearing 27 is filled (press-fitted) to a front end portion in the holding cylinder portion 24. A slit 28 extending in the front-rear direction is formed in a region other than the front end portion of the holding cylinder portion 24. In a case of the present embodiment, the slit 28 is provided on a lower side of the outer column 21. The slit 28 penetrates the outer column 21 in the shaft radial direction and is open to a rear end side of the outer column 21.

As shown in FIG. 4, the tightening portions 25 extend downward from positions of the holding cylinder portion 24 facing each other in the left-right direction with the slit 28 interposed therebetween. A through hole 29 that, penetrates the tightening portion 25 in the left-right direction is formed in each tightening portion 25.

As shown in FIGS. 1 and 3, the inner column 22 is formed in a cylindrical shape and extends in the front-rear direction. An outer diameter of the inner column 22 is smaller than an inner diameter of the holding cylinder portion 24. The inner column 22 is inserted into the holding cylinder portion 24 from the rear. The inner column 22 is configured to be movable in the front-rear direction with respect to the outer column 21. As shown in FIG. 3, a rear bearing 30 is titled (press-fitted) to a rear end portion in the inner column 22.

Figure 5:
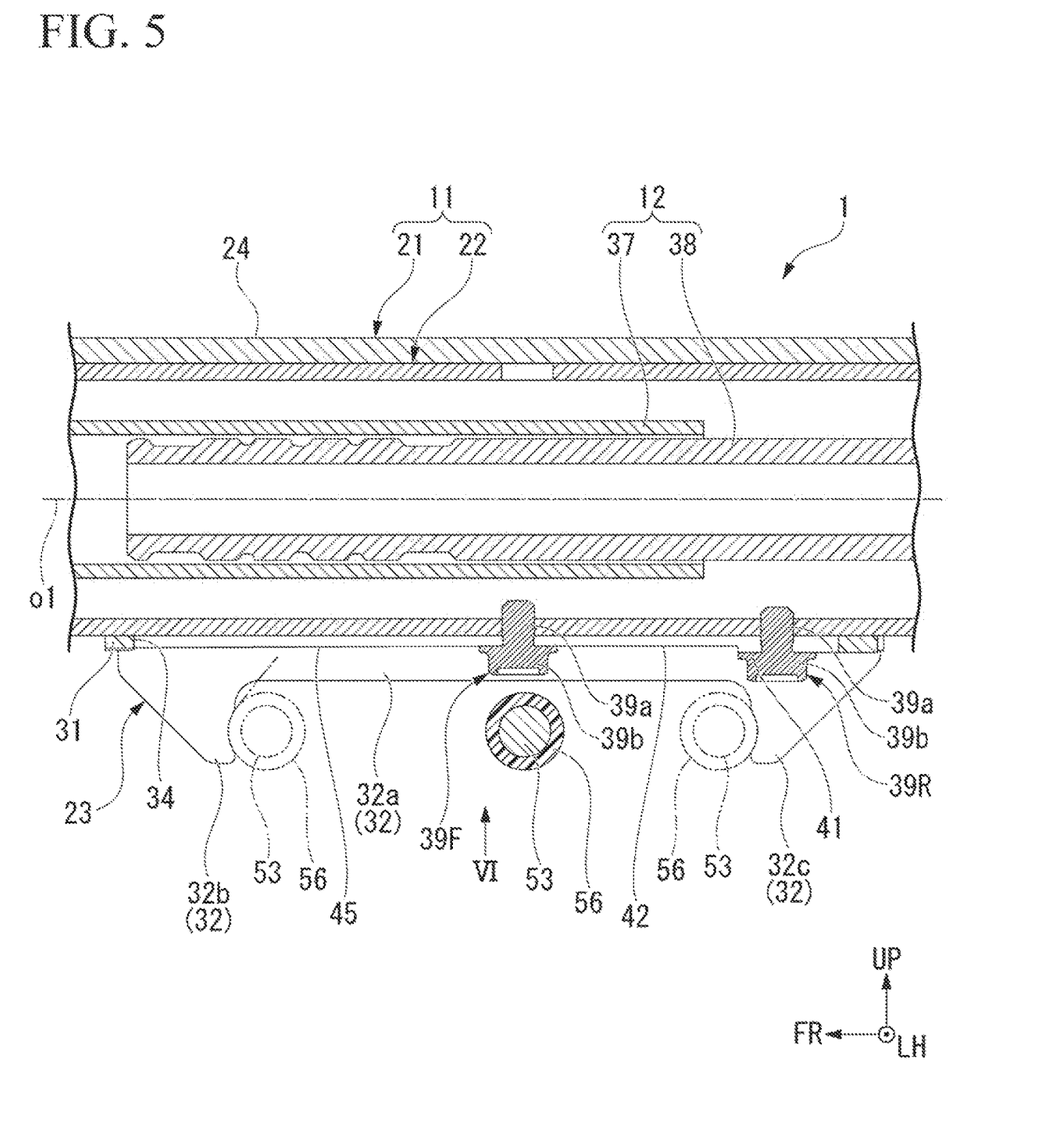
FIG. 5 is an enlarged view of a main part of FIG. 3.

FIG. 5 is an enlarged view of a main part of FIG. 3.

As shown in FIGS. 4 and 5, the hanger bracket 23 is fixed to a lower surface of the inner column 22 near a front portion to face downward, in the present embodiment, the hanger bracket 23 is integrally formed of a metal material. It is possible to form the hanger bracket 23 by, for example, performing press working on a metal plate. As shown in FIG. 2, the hanger bracket 23 is exposed to the outside (downward) of the holding cylinder portion 24 through the slit 28 of the holding cylinder portion 24. As shown in FIG. 4, the hanger bracket 23 is formed substantially in a U-shape that is open downward in a front view w when viewed in the front-rear direction.

Figure 6:
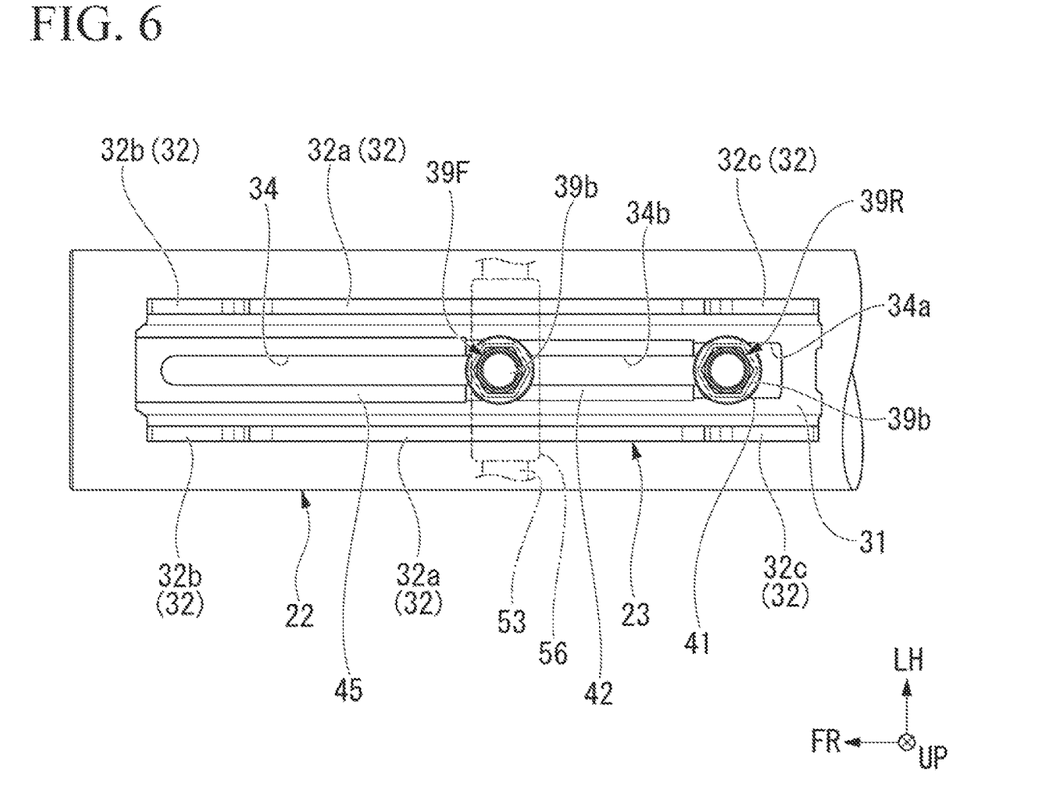
FIG. 6 is a view in a direction of an arrow VI of FIG. 5.

FIG. 6 is a view in a direction of an arrow VI of FIG. 5. In FIG. 6, a collar 56 and a lock bolt 53, which wall be described later, are drawn by a virtual line.

The hanger bracket 23 includes an attachment plate portion 31 disposed in the axial direction of the inner column 22 and a pair of side walls 32 extending downward front both end portions of the attachment plate portion 31 in the left-right direction.

The attachment plate portion 31 extends in the front-rear direction along the lower surface of the inner column 22 with the vertical direction as a plate thickness direction. The attachment plate portion 31 is formed substantially in a rectangular shape that is long in the front-rear direction in a bottom view. A guide hole 34 that penetrates the attachment plate portion 31 in the vertical direction is formed in the attachment plate portion 31. The guide hole 34 is constituted by a slit-shaped hole extending long in the front-rear direction as compared with a width in the left-right direction. The detailed shape of the guide bole 34 will be described later.

The hanger bracket 23 is fixed at two positions of the lower surface of the inner column 22 separated in the front-rear direction from each other by two bolts 39F and 39R each of which is a fastening member (a fixing member). As shown in FIG. 5, each of the bolts 39F and 39R has a shaft portion 39a which vertically passes through the attachment plate portion 31 (a portion of the guide hole 34) of the hanger bracket 23 and of which one end side (an upper end side) is coupled to the inner column 22 and a head portion 39b integrally provided on the other end side (a lower end side) of the shaft portion 39a. The head portion 39b comes into contact with the attachment plate portion 31 (an edge portion o1 the guide hole 34) of the hanger bracket 23 and presses the attachment plate portion 31 against the lower surface of the inner column 22 to fix the hanger bracket 23 to the inner column 22. The shaft portion 39a of the bolt 39R on the rear side is coupled to the lower surface of the inner column 22 at an approximately central position in the axial direction, and the shaft portion 39a of the boil 39F on the front side is coupled to the lower surface of the inner column 22 on a front side front the central position.

In the present embodiment, the head portion 39b of each of the bolts 39F and 39R constitutes a seat portion in the fastening member (the fixing member).

In the present embodiment, a configuration in which the bolts 39F and 39R are directly fixed to the inner column 22 as the fastening member (the fixing member) has been described, but the present invention is not limited to this configuration. For example, the bolts 39P and 39R may be fastened to the inner column 22 by being screwed into nuts provided inside the inner column 22. The fastening member (the fixing member) may be constituted by a stud bolt projecting from the inner column 22 and a nut screwed onto the stud bolt. In this case, the nut constitutes the seat portion.

Further, the fixing member is not limned to the fastening members, and a rivet or the like having no screwing means can be used. If the fixing member is constituted by a rivet, the head portion of the rivet constitutes the seat portion.

The side wall 32 of the hanger bracket 23 is formed over the entire area of the attachment plate portion 31 in the front-rear direction. The side wall 32 includes a telescopic guide portion 32a having a constant down protrusion height and a pair of stopper portions 32b and 32c having a higher protrusion height than the telescopic guide portion 32a.

The telescopic guide portion 32a is formed in a region of the side wall 32 excluding both front and rear ends. A lower end edge of the telescopic guide portion 32a is formed linearly in the front-rear direction. One (32b) of the stopper portions 32b and 32c is integrally formed with a front end portion of the telescopic guide portion 32a, and the other (32c) is integrally formed with a rear end portion of the telescopic guide portion 32a. The front and rear stopper portions 32b and 32c project downward wish respect to the telescopic guide portion 32a.

The front stopper portion 32b restricts rearward displacement of the inner column 22 with respect to the outer column 21 by coming into contact with the lock bolt 53, which will be described later, via the collar 56 during the telescopic operation. The rear stopper portion 32c restricts forward displacement of the inner column 22 with respect to the outer column 21 by coming into contact with the lock bolt 53, which will be described later, via the collar 56 during the telescopic operation. A rear edge portion of the front stopper portion 32b and a front edge portion of the rear stopper portion 32c are formed in an arc shape substantially matching an arc shape of an outer peripheral surface of the collar 56.

<Steering Shaft 2>

As shown in FIG. 3, the steering shaft 12 includes an outer shaft 37 and an inner shaft 38.

The outer shaft 37 is formed in a hollow cylindrical shape extending in the front-rear direction. The outer shaft 37 is inserted in the column unit 11. A front end portion of the outer shaft 37 is press-fitted to the front hearing 27 in the outer column 21. As a result, the outer shaft 37 is rotatably supported by the outer column 21 around the axis o1. The front end portion of the outer shaft 37 (a portion protruding forward front the front bearing 27) is connected to, for example, a steering gear box (not shown) via a universal joint (not shown) or the like.

Like the outer shaft 37, the inner shaft 38 is formed in a hollow cylindrical shape extending in the front-rear direction. The inner shaft 38 is inserted in the inner column 22. A rear end portion of the inner shaft 38 is press-fitted to the rear bearing 30 in the inner column 22. As a result, the inner shaft 38 is rotatably supported by the inner column 22 around the axis o1. The steering wheel 2 (see FIG. 1) is integrally rotatably connected to a portion of the inner shaft 38 protruding rearward from the inner column 22.

A front end portion of the inner shaft 38 is inserted into the outer shaft 37 in the inner column 22. The inner shaft 38 is configured to be displaceable in the front-rear direction with respect to the outer shaft 37 together with the inner column 22 as the inner column 22 moves in the front rear direction with respect to the outer column 21.

In the present embodiment, a female spline is formed in an inner peripheral surface of the outer shaft 37. The female spline engages with a male spline formed on an outer peripheral surface of the inner shaft 38. As a result the inner shaft 38 is displaced in the front-rear direction with respect to the outer shaft 37 after relative rotation with respect to the outer shaft 37 is restricted. However, an expansion and contraction structure or a rotation restriction structure of the steering shaft 12 can be changed as appropriate.

In the present embodiment, a configuration in which the outer shaft 37 is disposed in front of the inner shaft 38 has been described, but the present invention is not limited to this configuration, and a configuration in which the outer shaft 37 is disposed behind the inner shaft 38 is also possible.

<Front Bracket 13>

As shown in FIG. 1, the front bracket 13 is formed in a U-shape that is open downward in a front view. The front bracket 13 surrounds a front end portion of the outer column 21 front the upper side and both sides in the left-right direction. Of the front brackets 13, front side walls 13a located on both sides in the left right direction are rotatably connected to the front, end portion of the outer column 21 via a pivot shaft 40. As a result, the outer column 21 is supported by the front bracket 13 to be rotatable around an axis o2 extending in the left-right direction of the pivot shaft 40. Therefore, the front end portion of the outer column 21 is supported by the vehicle body to be rotatable around the axis o2 and with the displacement in the front-rear direction restricted.

<Rear Bracket 14>

The rear bracket 14 is formed substantially in a U-shape that is open downward in a front view. The rear bracket 14 surrounds the upper side and the left and right sides of a rear region of the outer column 21. The rear bracket 14 holds the rear region of the outer column 21 via the lock mechanism 15 which wilt be described later. Since the rear bracket 14 is fixed to the vehicle body side by bolting or the like, the rear region of the outer column 21 is supported by the vehicle body via the lock mechanism 15 and the rear bracket 14.

In the rear bracket 14 of the present embodiment a single metal plate cut out into a predetermined shape is formed into a predetermined shape by press working or the like. The rear bracket 14 includes rear side walls 14a disposed on the left and right sides of the column unit 11, a fixed flange 14c extending to be curved outward from the upper end portion of each of the left and right rear side walls 14a in the left-right direction, and a connecting wall 14d that connects the rear portions of the left and right rear side walls 14a to each other. The connecting wall 14d is disposed forward from the left and right fixed flanges 14c and the left and right rear side walls 14a and is formed to be folded substantially in a U-shape such that it straddles the upper part of the holding cylinder portion 24 of the outer column 21 on the left and right.

As shown in FIG. 4, a tilt guide hole 14b that penetrates the rear side walls 14a in the left-right direction is formed in each of the left and right rear side walls 14a. The tilt guide hole 14b is formed in an arc shape centered on the axis o2 of the pivot shaft 40.

A shaft portion of the lock bolt 53 of the lock mechanism 15, which will be described later, is inserted into the tilt guide hole 14b of each of the left and right rear side walls 14a. The shaft portion of the lock bolt 53 extends in the left-right direction. The tilt guide hole 14b allows the lock bolt 53 which is displaced integrally with the column unit 31 to swing in the vertical direction during a tilt operation in which the column unit 11 swings up and down about the pivot shaft 40.

The front bracket 13 and the rear bracket 14 are connected to each other by a connecting piece 100. The connecting piece 100 extends in the front-rear direction with the left-right direction as the thickness direction and connects the front side wall 13a on the right side of the front bracket 13 and the rear side wall 14a on the right side of the rear bracket 14. However, the connecting piece 100 is not an essential configuration.

<Lock Mechanism 15>

As shown in FIG. 4, the lock mechanism 15 includes the lock bolt 53, an operation lever 54, and a fastening cam 55.

The lock bolt 53 passes through the tilt guide holes 14b of the left and right rear side walls 14a of the rear bracket 14 and the through holes 29 of the left and right tightening portions 25 of the outer column 21 in the left-right direction. A collar 56 is attached to a central region of the lock bolt 53 (a portion located between the left and right tightening portions 25 of the outer column 21). The collar 56 is formed in a cylindrical shape coaxial with the lock bolt 53. The collar 36 is made of a material that is softer than the lock bolt 53 (for example, an elastically deformable material such as rubber or a resin material).

As shown in FIG. 5, when the inner column 22 is in the foremost end position (when the column unit 11 is in the most contracted state) during the telescopic operation, the stopper portion 32c on the rear side of the hanger bracket 23 comes into contact with the collar 56 from the rear. When the inner column 22 is in the rearmost end position (when the column unit 11 is in the most extended state) during the telescopic operation, the stopper portion 32b on the front side of the hanger bracket 23 comes into contact with the collar 56 front the front. That is, when the hanger bracket 23 is displaced in the front-rear direction together with the inner column 22 during the telescopic operation, one of the from and rear stopper portions 32b and 32c of the hanger bracket 23 comes into contact with the lock bolt 53 via the collar 56, whereby the excessive displacement of the inner column 22 in the front-rear direction is restricted. During the telescopic operation, a lower edge portion of the telescopic guide portion 32a of the hanger bracket 23 guides the relative displacement of the collar 56 (the lock bolt 53) in the front-rear direction.

In the present embodiment, the lock bolt 53 constitutes a displacement restricting portion on a side of the outer column 21. In the present embodiment, a configuration in which the stopper portions 32b and 32c comes into contact with the lock bolt 53 via the collar 56 during the telescopic operation or the like has been adopted, but a configuration in which the collar 56 is removed and the stopper portions 32b and 32c come into direct contact with the lock bolt 53 may be possible.

As shown in FIGS. 1 and 2, a biasing member 60 such as a coil spring is interposed between the left and right end portions of the lock bolt 53 and the fixed flange 14c of the rear bracket 14. The biasing member 60 biases the lock bolt 53 upward with the fixed flange 14c of the rear bracket 14 fixed to the vehicle body side as a starting point. Here, since the lock bolt 53 engages with the tightening portion 25 of the outer column 21 in a penetrated state as shown in FIG. 4, due to a biasing force of the biasing member 60, the rear region of the outer column 21 is biased upward. Therefore, the biasing member 60 prevents the column unit 11 from lowering due to its own weight when the lock is released (during the tilt operation).

The operation lever 54 is supported by the left end portion of the shaft portion of the lock bolt 53. As shown in FIG. 4, the fastening earn 55 includes two mutually rotatable cam plates 55a and 55b. The shall portion of the lock bolt 53 penetrates the two cam plates 55a and 55b. One cam plate 55a is connected to a base portion of the operation lever 54, and the other cam plate 55b is in contact with the side surface of the rear side wall 14a on the left side of the from bracket 13. One cam plate 55a rotates integrally with the base portion of the operation lever 54, and the other cam plate 55b is prevented from rotating by a tilt guide hole 14b or the like of the rear side wall 14a on the left side. The two cam plates 55a and 55b have cam protrusions (not shown) on surfaces facing each other. When the two cam plates 55a and 55b are in a rotational position where the cam protrusions of the two cam places face each other, the total thickness of the two cam plates (an axial width in an axial direction of the lock bolt 53) increases. When the two cam plates 55a and 55b are in a rotational position where the cam protrusions of the two cam plates do not face each other, the total thickness of the two cam plates (an axial width in an axial direction of the lock bolt 53) decreases.

The lock mechanism 15 changes she total thickness of the fastening cant 55 by rotating the operation lever 54, whereby the left and right tightening portions 25 of the outer column 21 approach each other or are separated front each other. Specifically, when the operation lever 54 is rotated to increase the total thickness of the fastening cant 55, the left and right tightening portions 25 are deformed to approach each other against the metal elasticity of the outer column 21. As a result, the inner diameter of the holding cylinder portion 24 of the outer column 21 is reduced, and the inner column 22 is sandwiched and fixed by the holding cylinder portion 24. As a result, the displacement of the inner column 22 in the shaft axial direction with respect to the outer column 21 is restricted (a locked state). At this time, the edge portion of the tilt guide hole 14b is sandwiched and fixed by the fastening cam 55 and the tightening portion 25 of the outer column 21, and the tilt operation of the outer column 21 (the column unit 11) is also locked.

On the other hand, in the locked stale, when the operation lever 54 is rotated to reduce the total thickness of the fastening cam 55, the left and right tightening portions 25 are elastically restored to be separated from each other. As a result, the inner diameter of the holding cylinder portion 24 of the outer column 21 is expanded, and the sandwiching and fixing of the inner column 22 by the holding cylinder portion 24 is released. As a result, the movement of the inner column 22 in the shaft axial direction with respect to the outer column 21 is allowed (an unlocked state). At this time, the sandwiching and fixing of the side edge portion of the tilt guide hole 14b by the fastening cam 55 and the tightening portion 25 of the outer column 21 is released, and the lilt operation of the outer column 21 (the column unit 11) is also allowed.

<Detailed Structure of Hanger Bracket 23>

In the steering device 1 of the present embodiment, the hanger bracket 23 is integrally fixed to the inner column 22 by the pair of bolts 39F and 39R. The fixing of the hanger bracket 23 by the bolts 39F and 39R is released when an excessive load acts on the steering shaft 12 and the inner column 22 forward from the occupant through the steering wheel 2 when the secondary collision load is input.

Specifically, when an excessive load acts on the inner column 22 forward front the occupant through steering wheel 2 and the steering shaft 12 at the lime of inputting the secondary collision load, the inner column 22 is displaced forward against a restraining force by the outer column 21 (a binding force by the lock mechanism 15). At this time, when the inner column 22 is displaced forward by a predetermined amount the stopper portion 32c of the hanger bracket 23 fixed to the inner column 22 comes into contact with the lock bolt 53 via the collar 56 and receives a reaction force from the lock bolt 53. In this way, when the input of the secondary collision load is further continued, the bolts 39F and 39R integrated with the inner column 22 overcome a frictional restraining force between the head portions 39h of the bolts 39F and 39R and the edge portion of the guide hole 34 and displace forward while leaving the hanger bracket 23. At this time, the shaft portion 39a of each of the bolts 39F and 39R moves forward along the guide hole 34 of the hanger bracket 23.

Figure 7:
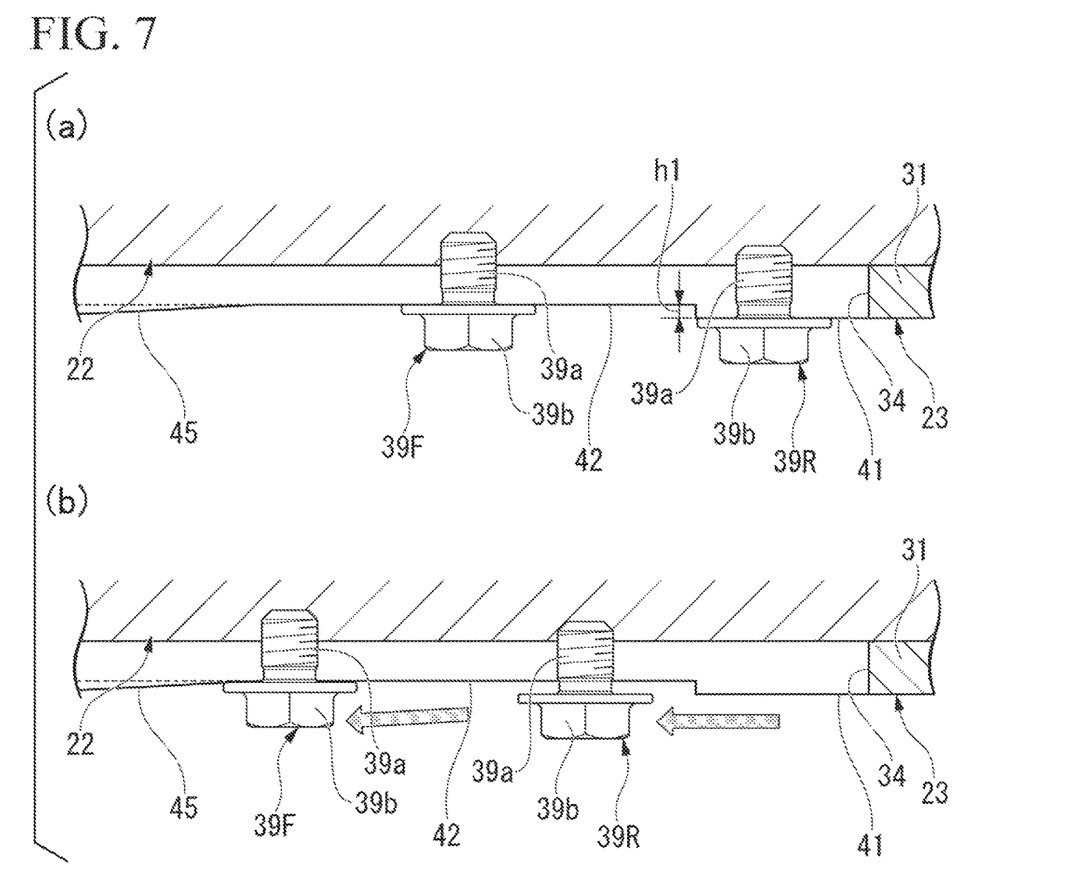
FIG. 7 is an enlarged cross-sectional view showing a part of FIG. 5.

FIG. 7 is an enlarged cross-sectional view showing a pan of FIG. 5. FIG. 7(a) shows a fixed state of the hanger bracket 23 and the inner column 22 by the bolls 39F and 39R, and FIG. 7(b) shows a relative displacement behavior between the hanger bracket 23 and the bolts 39F and 39R when the secondary collision load is input.

As shown in FIG. 6, the guide hole 34 formed in the attachment plate portion 31 of the hanger bracket 23 has a widened portion 34a disposed at an end portion on a rear side and a narrowed portion 34b extending forward from the widened portion 34a and having a width in the left right direction narrower than a width of the widened portion 34a. When the hanger bracket 23 is fastened and fixed to the lower surface of the inner column 22, as shown in FIGS. 5 and 7(a), the shaft, portion 39a of the bolt 39R on the rear side penetrates the widened portion 34a of the guide hole 34 in the vertical direction. The shaft portion 39a of the bolt 39F on the front side penetrates the narrowed portion 34b of the guide hole 34 in the vertical direction. At this time, when the shaft portion 39a of the bolts 39R and 39F is tightened to the inner column 22, the bead portion 39b (the seat portion) of each of the bolts 39R and 39F is pressed against the left and right edge portions of the widened portion 34a and the narrowed portion 34b from a lower surface side. As result, the hanger bracket 23 is fastened and fixed to the lower surface of the inner column 22.

Of the attachment plate portion 31 of the hanger bracket 23, the left anti right edge portions of the widened portion 34a of the guide hole 34 are a first facing surface 41 with which the head portion 39b of the bolt 39R on the rear side comes into contact when the hanger bracket 23 is fixed to the inner column 22. Of the attachment plate portion 31, the left and right edge portions of a rear region of the narrowed portion 34b (a region adjacent to the front end portion of the widened portion 34a) of the guide hole 34 are a second facing surface 42 with which the head portion 39b of the bolt 39F on the front side comes into contact when the hanger bracket 23 is fixed to the inner column 22. As shown in FIG. 7(a), the second facing surface 42 has a protrusion height in a direction toward the head portion 39b of the bolt 39F lower than that of the first facing surface 41 by a set height h1.

The head portion 39b of the bolt 39R on the rear side is disposed at a front end portion of the first facing surface 41 (a position adjacent to the second facing surface 42) in a state where the hanger bracket 23 is fixed to the inner column 22. The head portion 39b of the bolt 39P on the front side is disposed at a front end portion of the second facing surface 42 (a position adjacent to an inclined surface 45 which will be described later) in a state where the hanger bracket 23 is fixed to the inner column 22.

In the present embodiment, the first facing surface 41 of the edge portions of the guide hole 34 constitutes a fixing portion corresponding to the boll 39R on the rear side, and the second facing surface 42 of the edge portions of the guide hole 34 constitutes a fixing portion corresponding to the bolt 39F on the front side. The second facing surface 42 is disposed at a position adjacent to the front side of the first facing surface 41 and constitutes a link level region having a downward protrusion height (a protrusion height in a direction toward the seat portion of the fixing member) lower than that of the first facing surface 41.

The left and right edge portions of a front region of the narrowed portion 34b (a region separated forward front the widened portion 34a) of the guide hole 34 are an inclined surface 45 of which a downward protrusion height (a protrusion height in a direction toward the seat portion of fixing member) gradually increases toward a front side. The inclined surface 45 is formed to be smoothly continuous with the front end side of the second facing surface 42. The inclined surface 45 of the present embodiment has a planar shape whose height changes linearly toward the front. However, the inclined surface may have a curved surface shape in which the height increases in a curved shape toward the front.

When the head portion 39b of the bolt 39F is displaced from the position opposite the second facing surface 42 to the position opposite the inclined surface 45 along with the forward displacement of the inner column 22 at the time of input of the secondary collision load, a contact load between the head portion 39b of the bolt 39F and the inclined surface 45 gradually increases according to the forward displacement of the bolt 39F. In this way, when the contact load between the head portion 39b and the inclined surface 45 gradually increases, the frictional resistance between the head portion 39b of the bolt 39F and the banger bracket 23 gradually increases, and the frictional resistance between the hanger bracket 23 and the inner column 22 also gradually increases.

In the present embodiment, the inclined surface 45 constitutes a gradually increasing resistance portion.

The inclined surface 45 of the edge portion of the guide hole 34 is desirably disposed at a position that the head portion 39b of the bolt 39F on the front side passes over (comes to face) after the head portion 39b of the bolt 39R on the rear side is displaced to the position opposite the second facing surface 42 at the time of input of the secondary collision load.

Here, regarding the fixing of the hanger bracket 23 and the inner column 22 by the front and rear bolts 39F and 39R, the shaft portion 39a of each of the bolts 39F and 39R is tightened to the inner column 22, and thus the head portion 39b of each of the bolts 39P and 39R is pressed against the edge portion (the second facing surface 42 and the first facing surface 41) of the guide hole 34 by a force corresponding to tightening torque. At this time, a frictional restraining force corresponding to the lightening torque of the bolts 39F and 39R acts between the edge portion of the guide hole 34 of the hanger bracket 23 and the head portion 39b of each of the bolts 39F and 39R, and a frictional restraining force corresponding to the tightening torque of the bolts 39F and 39R also acts between the attachment plate portion 31 of the hanger bracket 23 and the lower surface of the inner column 22.

At the time of input of the secondary collision load, when the hanger bracket 23 which is displaced forward together with the inner column 22 comes into contact with the collar 56 (the lock bolt 53) at the stopper portion 32c, the bolts 39F and 39R are pushed forward with respect to the stopped hanger bracket 23. At this time, when the secondary collision load exceeds a predetermined value, as shown in FIG. 7(b), the bolts 39F and 39R are displaced forward against the frictional restraining force of the head portions 39b of the bolts 39F and 35R.

At this time, since the second facing surface 42 has a lower protrusion height and a smaller frictional restraining force on the head portion 39b of the bolt 39R on the rear side than the first facing surface 41, the bolt 39R on the rear side is smoothly displaced to the position opposite the second facing surface 42. On the other hand, since the protrusion height of the inclined surface 45 located in front of the second facing surface 42 gradually increases toward the front, when the head portion 39b of the bolt 39F on the front side is displaced to a position opposite the inclined surface 45, the contact load between the head portion 39b and the inclined surface 45 gradually increases according to the forward displacement of the head portion 39b of the bolt 39F. As a result, the frictional restraining force that the bolt 39F and the inner column 22 receive from the hanger bracket 23 also gradually increases.

Figure 8:
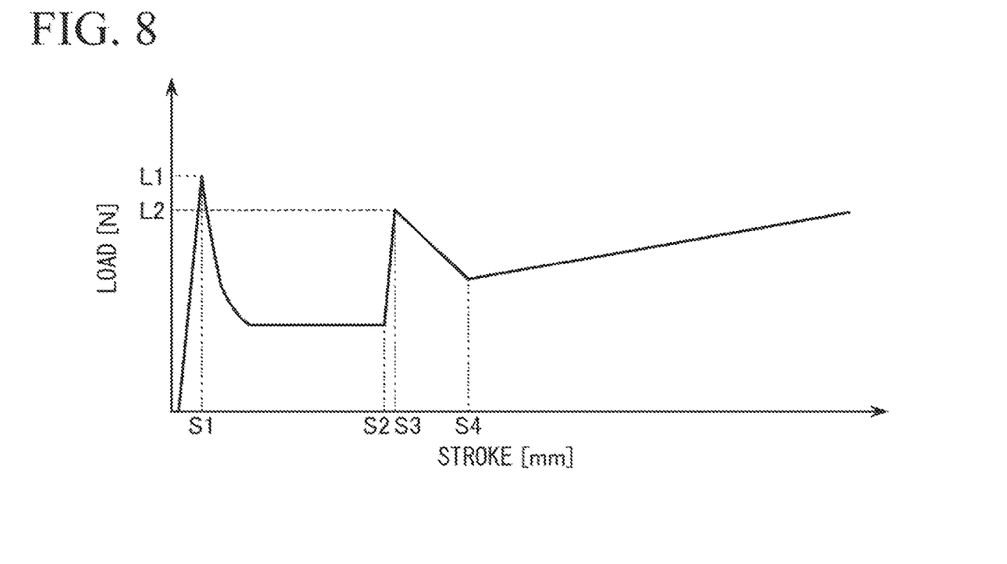
FIG. 8 is a characteristic diagram showing a relationship between a forward stroke of an inner column and a load acting between the inner column and an outer column when a secondary collision load is input in the steering device of the first embodiment.

FIG. 8 is a characteristic diagram showing a relationship between a forward stroke of the inner column 22 and a load acting between the inner column 22 and the outer column 21 when the secondary collision load is input in the steering device 1 of the present embodiment.

In FIG. 8, L1 is an operating load by which the inner column 22 begins to be displaced forward against the restraining force of the outer column 21 (the restraining force of the lock mechanism 15) due to the input of the secondary collision load, and S1 to S2 is a stroke in which the inner column 22 is displaced with respect to the outer column 21 in a telescopic operating range (a stroke until the stopper portion 32c comes into contact with the collar 56 (the lock bolt 53)). L2 is a load by which the stopper portion 32c comes into contact with the collar 56 (the lock bolt 53) and an initial operating load by which the bolts 39R and 39F begin to be displaced forward together with the inner column 22 while leaving the hanger bracket 23. S3 to S4 is a stroke in which the head portion 39b of the bolt 39R on the rear side shifts from the position opposite the first lacing surface 41 to the position opposite the second lacing surface 42. A region after S4 is a stroke in which the head portion 39b of the bolt 39F on the front side comes into contact with the inclined surface 45 and a frictional load gradually increases.

As shown in FIG. 8, when the secondary collision load is input, since the head portion 39b of the bolt 39R on the rear side is displaced front a position opposite a first contact surface having a high protrusion height to a position opposite a second contact surface having a low protrusion height, the initial operating load L2 can be suppressed to a relatively low level. Then, in the stroke region exceeding S4 where the head portion 39b of the bolt 39F on the front side faces the inclined surface 45, the contact load between the head portion 39b and the inclined surface 45 gradually increases according to the forward displacement of the bolt 39F. As a result, it is possible to efficiently absorb the energy of an impact load while suppressing a sudden increase in the reaction force near a stroke end on a front side of the inner column 22.

<Effect of Embodiment>

In the steering device 1 of the present embodiment, the edge portion of the guide hole 34 of the hanger bracket 23 is provided with the fixing portion (the first facing surface 41 and the second facing surface 42) against which the head portions 39b of the bolts 39R and 39F are pressed to fix the hanger bracket 23 to the inner column 22 and the gradually increasing resistance portion (the inclined surface 45) which gradually increases frictional resistance between the bolt 39F and the hanger bracket 23 when the inner column 22 is displaced forward due to the input of the secondary collision load. Therefore, when the secondary collision load is input, the posture of the inner column 22 can be stably maintained by the guiding action by the guide hole 34 of the hanger bracket 23 and the shaft portions 39a of the bolts 39R and 39F, and it is possible to efficiently absorb the energy of an impact load while suppressing a sudden increase in the reaction force near a stroke end on the front side of the inner column 22.

Therefore, in a case where the steering device 1 of the present embodiment is adopted, it is possible to efficiently absorb the energy of the collision load when the secondary collision load is input while reducing the size and cost.

In particular, in the steering device 1 of the present embodiment, as a means (the gradually increasing resistance portion) for gradually increasing the frictional resistance between the bolt 39F and the hanger bracket 23 when the inner column 22 is displaced forward, the inclined surface 45 of which a protrusion height gradually increases toward the front is provided on the edge portion of the guide hole 34 of the hanger bracket 23. Therefore, when the secondary collision load is input, the head portion 39b of the bolt 39F comes into contact with the inclined surface 45, and thus the frictional resistance between the bolt 39F and the hanger bracket 23 can be gradually increased. Therefore, in a case where the steering device 1 of the present embodiment is adopted, it is possible to efficiently absorb the energy of the collision load when the secondary collision load is input while the structure is extremely simple and the size and cost are reduced.

In the steering device 1 of the present embodiment, the plurality of bolts 39R and 39F, which are fixing members, are disposed at positions of the inner column 22 separated front each other in the axial direction, and the hanger bracket 23 is fixed to the inner column 22 at a plurality of positions separated from each other in the axial direction by the bolts 39R and 39F. The edge portion of the guide hole 34 of the hanger bracket 23 is provided with the first facing surface 41 anti the second facing surface 42 which are fixing portions to correspond to the bolts 39R and 39F. Therefore, when the secondary collision load is input, the guide action by the shaft portion 39a of the fixing member and the guide hole 34, and the fixing and sliding at the seat portion (the head portion 39b) of the fixing member and the edge portion of the guide hole 34 can be shared by the plurality of bolts 39R and 39F. Therefore, in a case where the present configuration is adopted, the behavior (collapse stroke) of the inner column 22 at the time of input of the secondary collision load can be further stabilized.

In the present configuration, since the hanger bracket 23 is fixed to the inner column 22 by the plurality of bolts 39F and 39R at positions separated in the front-rear direction, when the stopper portion 32b and 32c of the hanger bracket 23 comes into contact with the displacement restricting portion on a side of the outer column 21, it is possible to prevent the end portions of the hanger bracket 23 in the front-rear direction from being separated (floating) front the inner column 22. Therefore, in a ease where the steering device 1 of the present embodiment is adopted, the commercial value of the steering device 1 for adjusting the front-rear position of the inner column 22 can be enhanced, and the operation of the hanger bracket 23 or the inner column 22 can be stabilized when the secondary collision load is input.

Further, in the steering device 1 of the present embodiment, the low level region (the second facing surface 42) having a lower protrusion height than the first facing surface 41 is disposed at a position adjacent to the front side of the first facing surface 41 of the edge portion of the guide hole 34. Therefore, if is possible to reduce the frictional restraining force when the head portion 39*b* of the bolt 39R on the rear side is displaced from the position opposite the first facing surface 41 to the position opposite the second facing surface 42 at the time of input of the secondary collision load. Therefore, in a case where the present configuration is adopted, it is possible to keep the initial operating load relatively small when the secondary collision load is input and to absorb the energy of the secondary collision load smoothly.

The steering device 1 of the present embodiment adopts the bolls 39R and 39F, which are one mode of a fastening member, as a fixing member for fixing the hanger bracket 23 to the lower surface of the inner column 22. For the fastening member such as the bolts 39R and 39F, the tightening torque can be accurately managed by using a tool that can grasp the torque when tightening to the mating member. Therefore, in the steering device 1 having the present configuration, the frictional restraining force with respect to the hanger bracket 23 can be accurately set and adjusted by managing the tightening torque of the bolts 39R and 39F. Therefore, in a ease where the present configuration is adopted, the hanger bracket 23 can be securely fixed to the inner column 22 during normal use, and stable energy absorption performance can be obtained when the secondary collision load is input.

Second Embodiment

Figure 9:
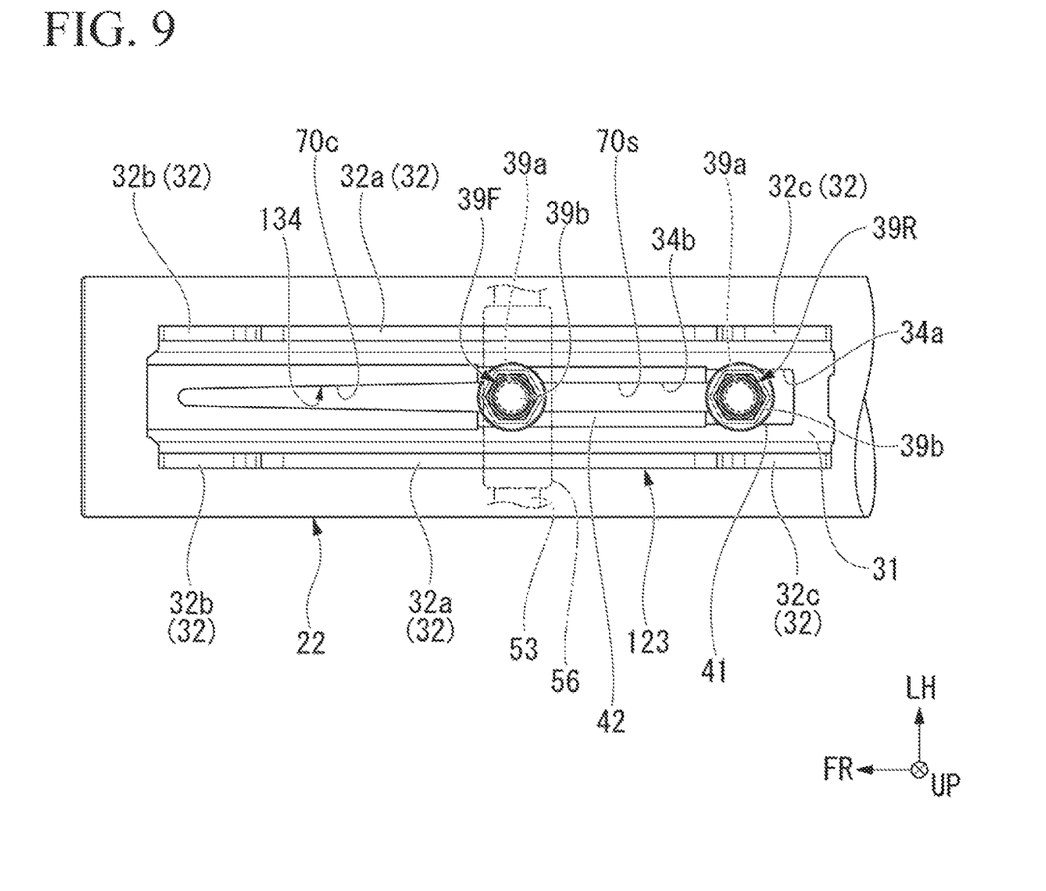
FIG. 9 is a view corresponding to FIG. 6 of the first embodiment of a steering device of a second embodiment.

FIG. 9 is a cross-sectional view corresponding to FIG. 7 of the first embodiment of a steering device of a second embodiment.

The steering device of the present embodiment differs from that of the first embodiment only in a structure of a hanger bracket 123 attached to the lower surface of the inner column 22.

Similar to the first embodiment, the hanger bracket 123 of the present embodiment has a guide hole 134 formed in the attachment plate portion 31, and the shaft portions 39*a* of the bolts 39F and 39R pass through the guide hole 134. The guide hole 134 has the widened portion 34*a* and the narrowed portion 34*b* extending forward from the widened portion 34*a*. The left and right edge portions of the widened portion 34*a* are the first lacing surface 41 (the fixing portion) with which the head portion 39*b* of the bolt 39R on the rear side comes into contact. The bolt 39R on the rear side is fixed to the lower surface of the inner column 22 by the shaft portion 39*a* being tightened thereto with the head portion 39*b* in contact with the first facing surface 41.

The narrowed portion 34*b* includes a straight hole portion 70*s* extending forward from the front end portion of the widened portion 34*a* and a gradually changing hole portion 70*c* extending further forward from the front end portion of the straight hole portion 70*s*. The straight hole portion 70*s* has substantially the same width as the shaft portion 39*a* of the bolt 39F (a width slightly wider than an outer diameter of the shaft portion 39*a*), and a width thereof remains constant and is continuous to the front side. The left and right edge portions of the straight hole portion 70*s* are the second facing surface 42 (the fixing portion) with which the head portion 39*b* of the bolt 39F on the front side comes into contact. The bolt 39F on the front side is fixed to the lower surface of the inner column 22 by the shaft portion 39*a* being tightened thereto with the head portion 39*b* in contact with the second facing surface 42. The bolt 39F on the front side is disposed at the front end portion of the straight hole portion 70*s* at this time.

In the present embodiment, the protrusion height of the second facing surface 42 is lower than the protrusion height of the first facing surface 41. The second facing surface 42 constitutes the low level region.

The width of the gradually changing hole portion 70*c* in the left-right direction (the width in a direction intersecting the front-rear direction of the guide hole 134) gradually decreases toward a front side. Specifically, the left and right sides of the gradually changing hole portion 70*c* extend linearly to be inclined close to a width center in the left-right direction toward the front side. The rear end portion of the gradually changing hole portion 70*c* has the same width as the straight hole portion 70*s* (a width slightly wider than the outer diameter of the shaft portion 39*a* of the bolt 39P). When the front displacement of the bolt 39F on the front side is restricted by the stopper portion 32*c* of the hanger bracket 123 coming into contact with the lock bolt 53 at the time of input of the secondary collision load, the shaft portion 39*a* thereof is displaced forward along the gradually changing hole portion 70*c*. At this time, the shaft portion 39*a* is displaced forward while plastically deforming the edge portion of the gradually changing hole portion 70*c*, and a contact load with the gradually changing hole portion 70*c* is gradually increased according to the forward displacement.

In the present embodiment, the gradually changing hole portion 70*c* constitutes the gradually increasing resistance portion.

In the steering device of the present embodiment, the edge portion of the guide hole 134 of the hanger bracket 123 is provided with the fixing portion (the first facing surface 41 and the second facing surface 42) against which the head portions 39*b* of the bolts 39R and 39F are pressed to fix the hanger bracket 123 to the inner column 22 and the gradually increasing resistance portion (the gradually changing hole portion 70*c*) which gradually increases frictional resistance between the bolt 39F and the hanger bracket 123 when the Inner column 22 is displaced forward due to the input of the secondary collision load. Therefore, also in a case of the present embodiment, when the secondary collision load is input, the posture of the inner column 22 can be stably maintained by the guiding action by the guide hole 134 of the hanger bracket 123 and the shaft portions 39*a* of the bolts 39R and 39F, and it is possible to efficiently absorb the energy of an impact load while suppressing a sudden increase in the reaction force near a stroke end on the front side of the inner column 22.

Therefore, also in a case where the steering device of the present embodiment is adopted, it is possible to efficiently absorb the energy of the collision load when the secondary collision load is input while reducing the size and cost.

In particular, in the steering device of the present embodiment, as a means (the gradually increasing resistance portion) for gradually increasing the frictional resistance between the bolt 39F and the hanger bracket 123 when the inner column 22 is displaced forward, the gradually changing hole portion 70*c* of which a width in the left right direction, gradually decreases toward the front side is provided in front of the straight hole portion 70*s* of the guide hole 134. Therefore, when the secondary collision load is input, the contact load between the shaft portion 39*a* and the gradually changing hole portion 70*c* gradually increases according to the forward displacement of the bolt 39F, and the frictional resistance between the bolt 39F and the hanger bracket 123 gradually increases. Therefore, in a ease where the steering device 1 of the present embodiment is adopted, it is possible to efficiently absorb the energy of the collision load when the secondary collision load is input while the structure is extremely simple and the size and cost are reduced.

The present invention is not limited to the above embodiments, and various design changes can be made without departing from the gist thereof. For example, in the above embodiment, the hanger bracket, is fixed to the inner column by two bolts, but the number of the fixing members for fixing the hanger bracket to the inner column is not limited to two and may be one or three or more.

What is claimed is:

1. A steering device comprising:

an inner column that rotatably supports a steering shaft;

an outer column which is supported by a vehicle body in a state where displacement thereof in a front-rear direction is restricted and in which the inner column is inserted such that a position thereof can be adjusted in the front rear direction;

a hanger bracket that is attached to the inner column and has a stopper portion which restricts excessive displacement of the inner column by coming into contact with a displacement restricting portion on a side of the outer column when the inner column is displaced in the front-rear direction; and a fixing member that has a shaft portion which passes through the hanger bracket and of which one end side is coupled to the inner column and a seat portion which is provided on the other end side of the shaft portion to press and fix the hanger bracket against and to the inner column, wherein the hanger bracket has a guide hole which extends in the front-rear direction and through which the shaft portion of the fixing member passes, wherein an edge portion of the guide hole of the hanger bracket is provided with a fixing portion with which the seat portion of the fixing member comes into contact to fix the hanger bracket to the inner column, and a gradually increasing resistance portion which is disposed in front of the fixing portion and gradually increases frictional resistance between the fixing member and the hanger bracket according to forward displacement of the fixing member when the fixing member is displaced forward together with inner column by a secondary collision load being input to the steering shaft.

2. The steering device according to claim 1, wherein an inclined surface of which a protrusion height in a direction toward the seat portion of the fixing member gradually increases toward a front side and a contact load with the seat portion gradually increases according to the forward displacement of the fixing member at the time of input of the secondary collision load is provided in front of the fixing portion of the edge portion of the guide hole, and wherein the gradually increasing resistance portion is constituted by the inclined surface.

3. The steering device according to claim 1, wherein a plurality of the fixing members are disposed at positions of the inner column separated from each other in an axial direction, wherein the hanger bracket is fixed at a plurality of positions of the inner column separated from each other in the axial direction by each of the fixing members, and wherein the hanger bracket is provided with the fixing portion to correspond to each of the fixing members.

4. The steering device according to claim 3, wherein a low level region having a protrusion height in a direction toward the seat portion of the fixing member lower than that of the fixing portion is disposed at a position adjacent to a front side of at least one fixing member of the edge portion of the guide hole.

5. The steering device according to claim 1, wherein the fixing member is a fastening member capable of managing tightening torque.

* * * * *